(12) United States Patent
Koseoglu et al.

(10) Patent No.: US 12,379,358 B2
(45) Date of Patent: Aug. 5, 2025

(54) INDUSTRIAL SCALE ENDOTHERMIC PILOT PLANT SYSTEM

(71) Applicant: SAUDI ARABIAN OIL COMPANY, Dhahran (SA)

(72) Inventors: Omer Refa Koseoglu, Dhahran (SA); Anas Farkad Alkhani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1009 days.

(21) Appl. No.: 17/332,484

(22) Filed: May 27, 2021

(65) Prior Publication Data

US 2022/0381752 A1    Dec. 1, 2022

(51) Int. Cl.
| | |
|---|---|
| *B01J 8/02* | (2006.01) |
| *B01J 8/18* | (2006.01) |
| *B01J 8/26* | (2006.01) |
| *G01N 3/10* | (2006.01) |
| *G01N 31/10* | (2006.01) |

(52) U.S. Cl.
CPC ............ *G01N 31/10* (2013.01); *B01J 8/0285* (2013.01); *B01J 8/1836* (2013.01); *B01J 8/1872* (2013.01); *B01J 8/26* (2013.01); *B01J 2208/00973* (2013.01)

(58) Field of Classification Search
CPC ....... G01N 31/10; B01J 8/0285; B01J 8/1836; B01J 8/1872; B01J 8/26; B01J 2208/00973
See application file for complete search history.

(56) References Cited

U.S. PATENT DOCUMENTS

| | | | |
|---|---|---|---|
| 6,497,844 B1 | 12/2002 | Bacaud et al. | |
| 6,548,305 B1 * | 4/2003 | Deves | G01N 31/10 422/62 |
| 6,869,800 B2 | 3/2005 | Torgerson et al. | |
| 7,063,982 B1 * | 6/2006 | Karlsson | G01N 31/10 422/139 |
| 8,361,798 B2 | 1/2013 | Ducreux et al. | |
| 8,502,004 B2 | 8/2013 | Butler et al. | |
| 9,943,819 B2 | 4/2018 | Sidhu | |

(Continued)

FOREIGN PATENT DOCUMENTS

| | | | |
|---|---|---|---|
| CN | 106370770 A | * | 2/2017 |
| CN | 106556668 B | | 7/2020 |

(Continued)

OTHER PUBLICATIONS

"Improvements in Ammonia Synthesis Catalyst" (Nitrogen, British Sulphur Pub. London, GB, vol. 193 Sep. 1991, pp. 17-31) (Year: 1991).*

(Continued)

*Primary Examiner* — Jill A Warden
*Assistant Examiner* — Michael Stanley Gzybowski
(74) *Attorney, Agent, or Firm* — Leason Ellis LLP

(57) ABSTRACT

The invention relates to an integrated process for assessing one or more properties of a catalyst. In the method, a standard chemical reactor or reactors is/are provided, and a bypass means is also provided, to transport a sample of whatever is added to the industrial reactor, to the test reactor. Both gases and liquids are transferred to the test reactor.

12 Claims, 3 Drawing Sheets

(56) References Cited

U.S. PATENT DOCUMENTS

| | | | |
|---|---|---|---|
| 2002/0059842 A1* | 5/2002 | Torgerson | G01N 1/20 73/866.5 |
| 2006/0148089 A1 | 7/2006 | Arvindan et al. | |
| 2008/0014127 A1 | 1/2008 | Ogawa et al. | |
| 2010/0028223 A1* | 2/2010 | Popham | B01J 8/0221 422/187 |
| 2011/0045596 A1* | 2/2011 | Ducreux | B01J 8/008 422/68.1 |

FOREIGN PATENT DOCUMENTS

| | | |
|---|---|---|
| CN | 107478764 B | 9/2020 |
| FR | 2777805 B1 | 6/2000 |
| JP | 4395366 B2 | 1/2010 |
| WO | 1998/07026 A1 | 2/1998 |
| WO | 2007104290 A1 | 9/2007 |
| WO | 2008080361 A1 | 7/2008 |
| WO | 2016110408 A1 | 7/2016 |

OTHER PUBLICATIONS

Petrov L. "Problems and challenges about accelerated testing of the catalytic activity of catalysts." Principles and methods for accelerated catalyst design and testing. Springer, Dordrecht, 2002. 13-69.
Examination Report for corresponding Saudi Arabia Application No. 122431113 dated Dec. 22, 2024 (10 pages).

\* cited by examiner

INDUSTRIAL SCALE ENDOTHERMIC PILOT PLANT SYSTEM

FIELD OF THE INVENTION

The invention relates to an apparatus useful in testing properties of a catalyst, as well as processes for using this apparatus for testing a catalyst.

BACKGROUND AND PRIOR ART

Process conversion plants used in industries such as oil, gas, chemical, and petrochemicals rely on catalysts as essential components of processes designed to yield the maximum amount of a desired product or products while simultaneously optimizing the energy requirements necessary to achieve these aims.

"Catalysts" as used in these fields, generally comprise a catalytically active metal, such as one or more of Co, Mo, Ni, W, Pt and Pd (these are exemplary and not limitative), and a support material, which may be but is not necessarily, such as an amorphous alumina, titania, silica or one of a crystalline zeolite. It is to be understood that by "active metal," this application means one or more than one, combined, and this is also the case for the components of the support. In brief, a well designed catalyst drives the kinetics of a desired reaction in the desired direction.

The artisan knows that industrial catalysts are available in different states and compositions, across essentially all industries.

The design of catalysts is challenging, and when one is interested in a specific reaction or specific reactions, multiple options are presented. Every user has its own selection criteria for the catalyst(s) used. These include, e.g., the nature of the feedstock, the objective, the desired yield, and so forth.

The factors that are at issue with respect to selection of a catalyst generally require the user to test multiple options before proceeding with the catalyst selected. These testing procedures are expensive and require a great deal of time.

Turning to catalysts and their use in the petrochemical industry, the catalysts in question are generally evaluated in pilot plants, over a period of from 2 weeks to 1 year. Some of the performance parameters which are evaluated for each catalyst system are activity, selectivity, and stability. Testing stability of a catalyst requires a longer period of time than the other performance parameters being evaluated and, given limited resources, "bottlenecks" the ability to evaluate further catalysts.

The methods available for overcoming this bottleneck are manageable but at the expense of time and cost. For example, building additional pilot plants is very expensive.

An alternative to building more facilities involves placing a small receptacle (generally referred to as a "basket"), inside a commercial reactor, together with a small amount of the catalyst being tested. The catalyst then acts with whatever feedstock is being treated, in a chosen reaction cycle at chosen conditions. This approach means that one cannot assess the catalyst until after the cycle is completed. Further, assessing the stability by, e.g., determining the remaining activity of the catalyst requires the use of the aforementioned pilot plant.

When all factors are considered, it is not at all unusual for the testing period for a particular catalyst to run for 2-3 years.

The foregoing details the current state of the art with respect to catalyst testing. In short, feedstock is sampled at an operating facility, shipped to a testing facility, and undergoes several months of testing. Alternatively, "basket utilization" requires 2-3 years of testing. Both approaches are lengthy, and expensive.

U.S. Pat. No. 8,361,798 to Ducreux, et al., which is incorporated by reference, teaches a methodology, referred to as "grafting" in the disclosure, because a catalyst testing device is "grafted" onto an industrial installation. The disclosure features a two phase system in which the feedstock must be liquid and the catalyst must be solid. The configuration of the test system does not allow for testing of vapor phase components. The ability to test a catalyst with a vaporous feedstock is critical, especially in systems which use endothermic reaction systems, where the reactor effluents must be heated between the reactors.

Additional prior art related to the invention includes U.S. Pat. No. 9,943,819 to Sedhu, et al., which utilizes basket type technology of the type discussed above, but does not integrate a test system with an industrial reactor system.

U.S. Pat. No. 8,502,004 to Butler, et al., describes the type of system discussed supra, involving pilot plants. Such systems, as will be understood by the skilled artisan, can only approximate actual working conditions. Additional prior art documents which may be of interest include U.S. Pat. No. 6,869,800 to Torgenson, et al.; U.S. Pat. No. 6,497,844 and its French counterpart FR 2777805 to Bacaud, et al.; published U.S. Patent Application No. U.S. 2008/0014127 to Ogawa, et al.; published U.S. Patent Application No. U.S. 2006/0148089 and its International Application counterpart, WO 2006/083437, International Application WO 2007/104290; WO 1998/07026, and its Canadian counterpart CA 2 263 212 and Petrov, "Problems and Challenges about Accelerated Testing of the Catalytic Activity of Catalysts" in Principles & Methods for Accelerated Catalyst Design and Testing. All of the references cited herein are incorporated by reference.

None of these documents teach or suggest the invention, which is elaborated upon in the disclosure which follows.

SUMMARY OF THE INVENTION

The invention is an apparatus and method for assessing catalysts. The invention affords the artisan the opportunity to test the catalyst under completely real time conditions. A test unit which can assess a catalyst in operation on a vaporous feedstock, is installed adjacent to a commercial reactor system, and receives a sample of the vaporous feedstock which is identical to the one used in the commercial reactor, under the identical conditions of the reaction. While the invention might be viewed as a "mini pilot plant," this is not completely accurate, as a pilot plant can approximate, but cannot duplicate, the conditions of a commercial reactor system. The invention permits vast reductions in the amount of time necessary to assess a catalyst resulting in, e.g., vast reductions in the cost of this aspect of the petroleum refining industry.

In one embodiment of the invention, the test unit is configured so that individual test reactors can be depressurized and isolated, which allows the user to replace one or more of the catalysts in any of the test reactors, as frequently as is necessary or desirable.

DETAILED DESCRIPTION OF PREFERRED EMBODIMENTS

Figure 1:
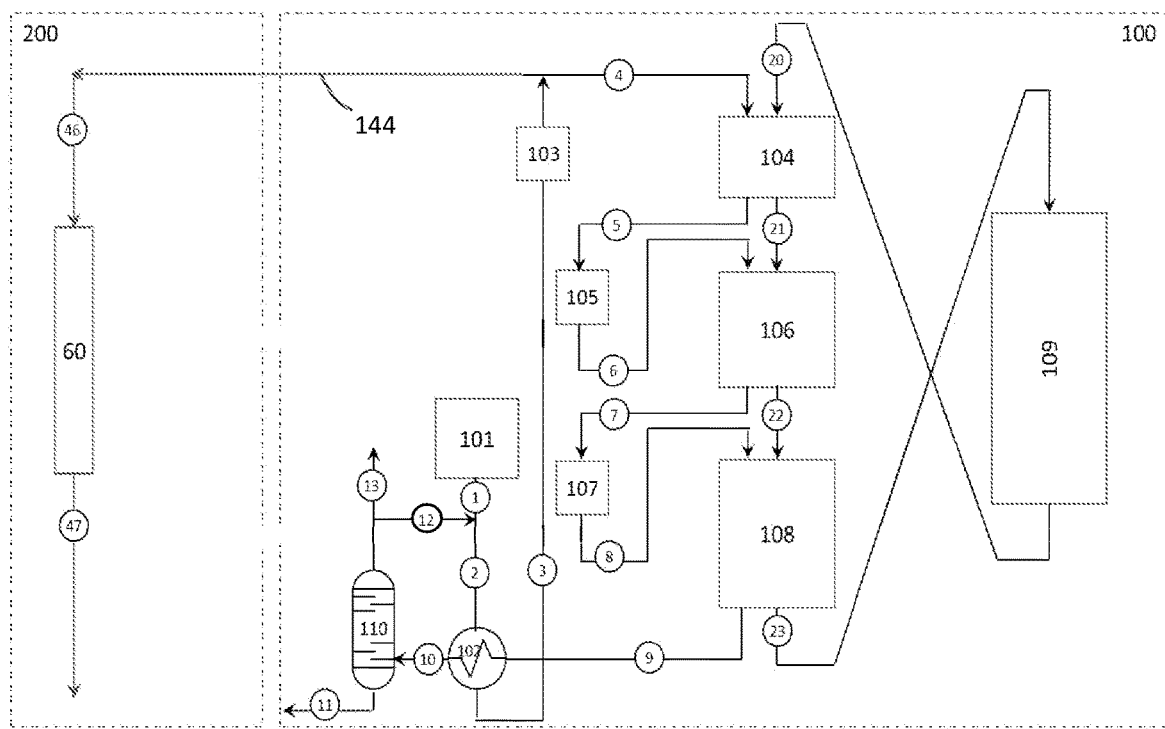
FIG. 1, shows a schematic diagram of an embodiment of the endothermic pilot plant system according to the invention connected to a catalytic reforming unit with continuous catalyst regeneration and continuous catalyst feeding.

FIG. 1 shows an embodiment of the pilot plant system according to the invention including a test unit 200 connected to a commercial endothermic reforming system 100. In FIG. 1, the commercial endothermic reforming system 100 is a known catalytic reforming system for reforming a naphtha feed. Briefly, fresh naphtha feed 1 is supplied from feed tank 101 and mixed with hydrogen 12. The hydrocarbon/hydrogen mixture 2 passes through feedstock/reformate exchanger 102 and is then successively subjected to catalytic treatment in serially connected reactors 104, 106, 108. Prior to entering each reactor 104, 106, 108, the feed is heated in respective furnaces 103, 105, 107 to form a vapor or is heated to reaction temperature. Thus, the hydrocarbon/hydrogen mixture enters the reactors and contacts the catalyst in vapor form or at reaction temperature. From reactor 108, the effluent 9 is then conducted through feedstock/reformate exchanger 102, and the heat exchanged effluent 10 is separated into liquid reformate 11 and hydrogen 12/13 in separator 110. A portion 12 of the hydrogen is then used for mixing with fresh feedstock 1.

It is well known that, in the petrochemical industries, various types of reactors, such as fixed bed, ebulliated bed, continuous stirred bed reactors, slurry bed reactors, moving bed reactors, and combinations of these. The reactors may be as fixed bed or moving bed configuration. In the embodiment shown in FIG. 1, the reactors are moving bed reactors, and the catalyst is successively fed through reactors 104, 106 and 108 and is regenerated in catalyst regenerator 109. The regenerated catalyst stream 20 is then recycled back to reactor 104.

With continued reference to FIG. 1, the test unit 200 includes at least one test reactor 60 containing a catalyst to be tested. The reactor 60 is connected to the commercial system 100 via a conduit 144, for receiving vaporous hydrocarbon mix, or the reactants heated to the reaction temperature, from the commercial system 100. The conduit 144 can be connected to the commercial system 100 downstream of any one of the furnaces 103, 105, 107. In the embodiment shown in FIG. 1, the test reactor 60 receives reactants from the commercial system 100 downstream of furnace 103. As a result, the catalyst present in the test reactor receives the identical feed under identical conditions as reactor 104 of the commercial system 100.

As the hydrocarbon feed passes through the reactors 104, 106, 108 of the commercial system 100, its composition and properties change. For example, the product of feed 6 is different from the product of feed 8. To evaluate the performance of the catalyst to be tested on hydrocarbon of feed 6 or 8 of the commercial system 100, the test reactor 60 can be connected to the commercial system 100 downstream of furnace 105 or 107 via the conduit to receive a portion of feed 6 or 8. Following reaction in the test reactor 60, the products of stream 47 are then analyzed to determine the efficacy of the catalyst of interest. In an embodiment, the products of stream 47 are first separated using a gas liquid separator and the resulting liquid and/or gas are then analyzed. In further embodiments, such a gas/liquid separator can be provided downstream of any or all of the test reactors.

Figure 2:
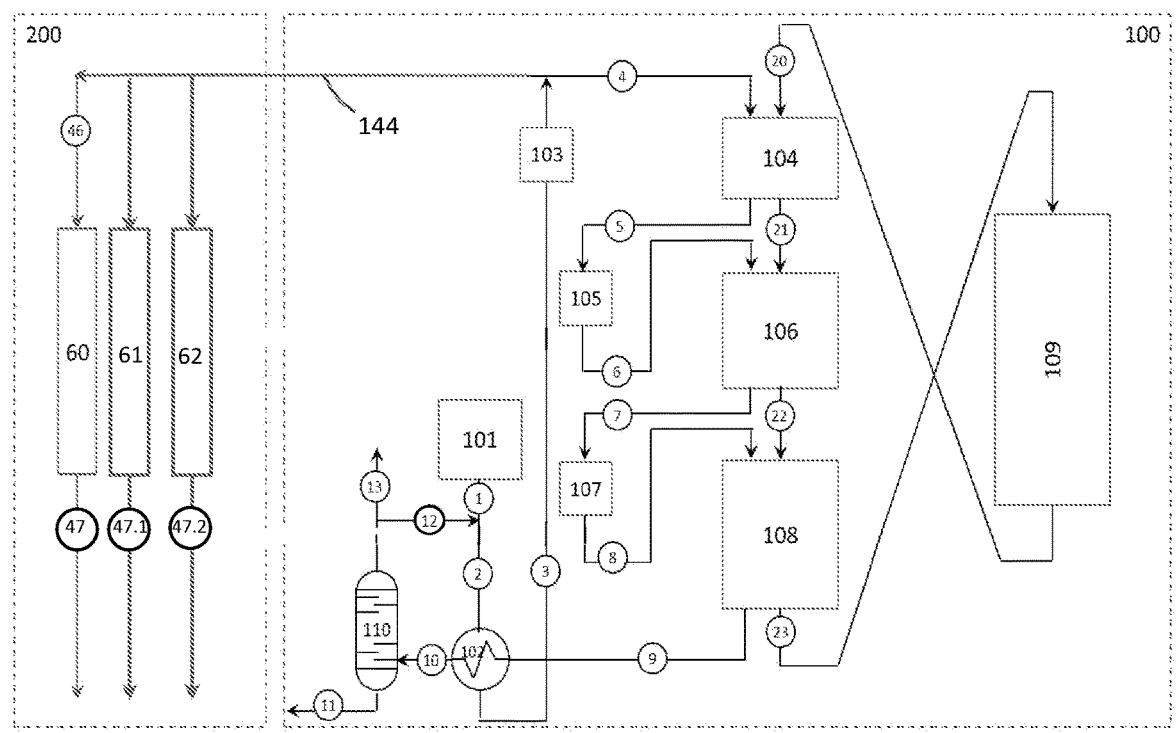
FIG. 2 shows the embodiment of FIG. 1 with three test reactors.

In another embodiment, the test unit 200 can include more than one test reactors. FIG. 2 shows an embodiment in which the test unit 200 includes 3 test reactors 60, 61, 63 connected to the commercial system 100 via conduit 144. This allows simultaneous testing of different catalysts of interest with the same feed under the same conditions. The products of streams 47, 47.1 and 47.2 are then analyzed to determine the efficacy of the different catalysts of interest.

Figure 3:
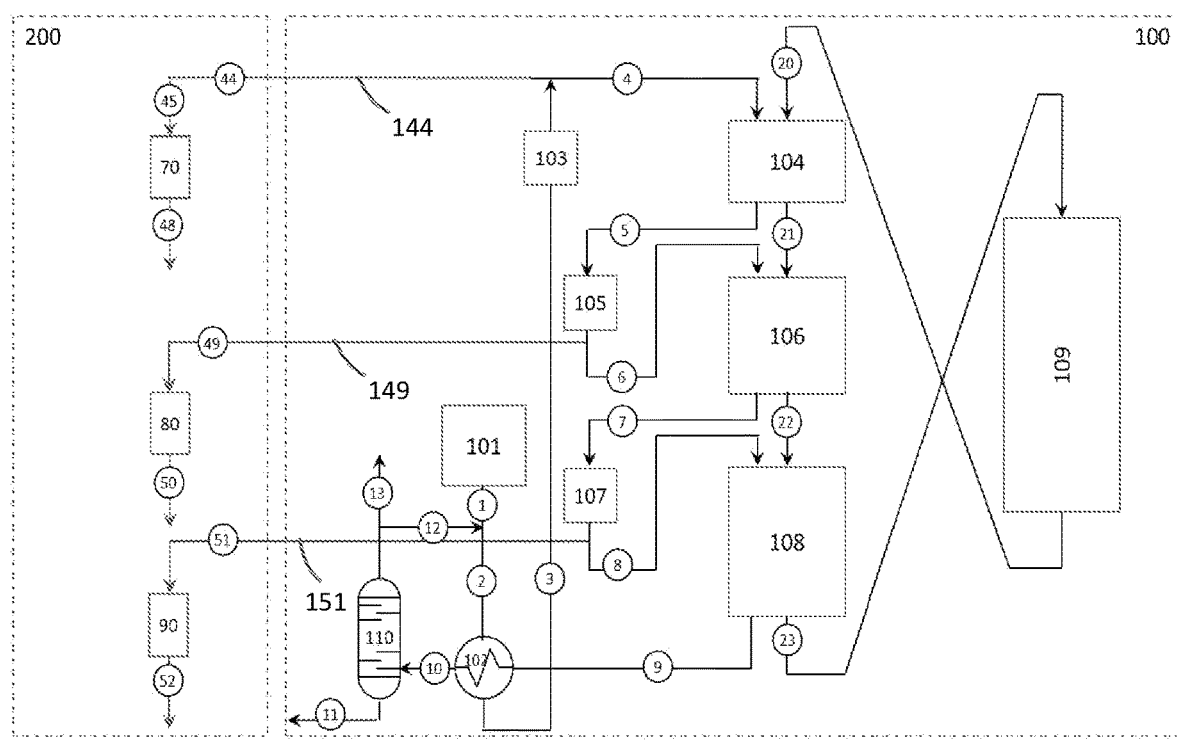
FIG. 3 shows another embodiment of the system according to the invention.

FIG. 3 shows a further embodiment in which the test unit 200 includes 3 test reactors 70, 80, 90. Each of the test reactors 70 80, 90 is connected to a different point of the commercial system 100 via respective separate conduits 144, 149, 151. This allows simultaneous testing of a catalyst under different conditions encountered during processing of the hydrocarbon feed in the commercial reactor 100.

Combinations of the embodiments shown in FIGS. 2 and 3 are also possible. For example, the embodiment shown in FIG. 3 can be modified so that the test unit 200 includes additional test reactors connected to the commercial system 100 via conduits 144, 149, 151 so that any or all of the conduits 144, 149, 151 deliver hydrocarbon feed from the commercial system 100 to more than one test reactor, similar to the conduit 144 shown in FIG. 2 which delivers the same feed to reactors 60, 61, 62.

In another, embodiment, any or all of the test reactors of the test unit 200 according to the invention can contain more than one catalyst. For example, the test reactors may contain two catalysts arranged in the reactor so as to come into contact with the vaporous feed received from the commercial system 100 via the respective conduits.

It should be noted that the number of reactors and catalysts being evaluated may vary, and is a matter left to the skilled artisan to choose.

Figure 4:
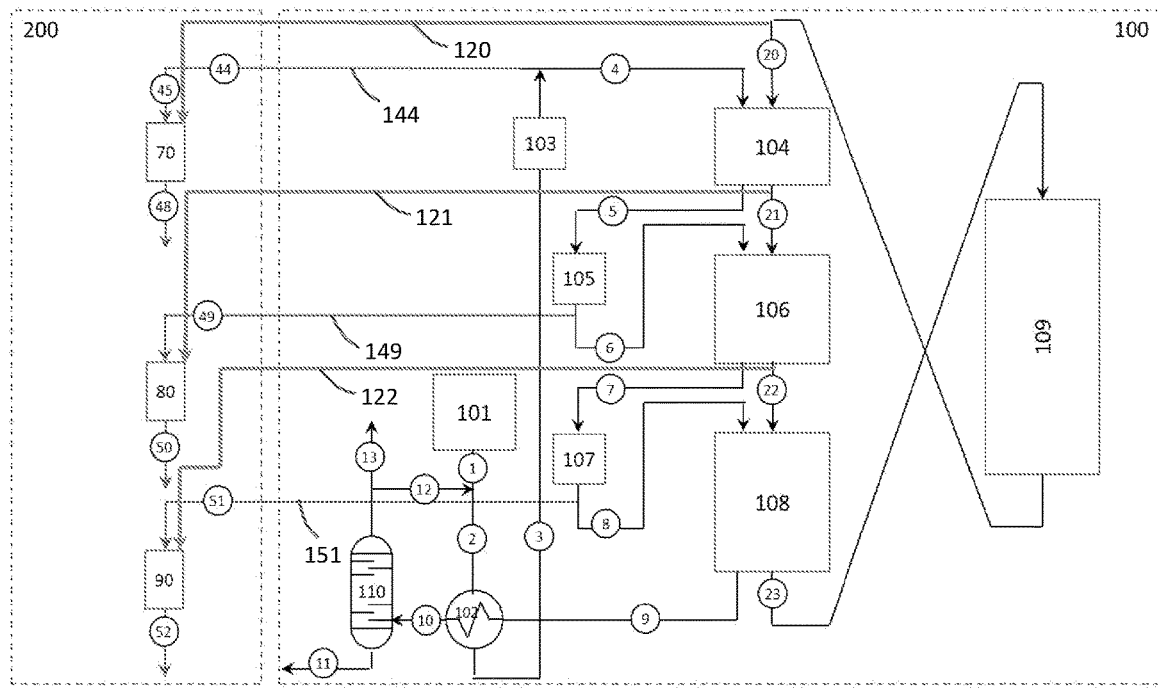
FIG. 4 shows another embodiment of the system according to the invention configured for testing regenerated catalyst.

FIG. 4 shows another embodiment of the pilot system similar to the embodiment of FIG. 3. The embodiment of FIG. 4 differs from FIG. 3 in that conduits 120, 121, 149 are additionally present for conducting a catalyst-containing feed from various points of the commercial system 100 to the reactor(s) of the test unit 200. It is known that the efficacy of regeneration of catalysts in regenerators varies depending on the catalyst at hand. This embodiment enables testing the performance of regenerated catalyst that has passed through the commercial system 100 and the catalyst regenerator.

In the embodiment shown in FIG. 4, a portion of the catalyst passes from reactor 104 to reactor 106 and then to reactor 108. The embodiment of FIG. 4 allows withdrawing and testing regenerated catalyst from a catalyst-containing feed 20 directly downstream of the catalyst regenerator 109 via conduit 120 to test reactor 70. Likewise, a portion of catalyst containing feed 21 and/or 22 can be withdrawn downstream of reactor 104 and/or reactor 106 to test reactors 80, 90 respectively via respective conduits 121 and 122.

Figure 5:
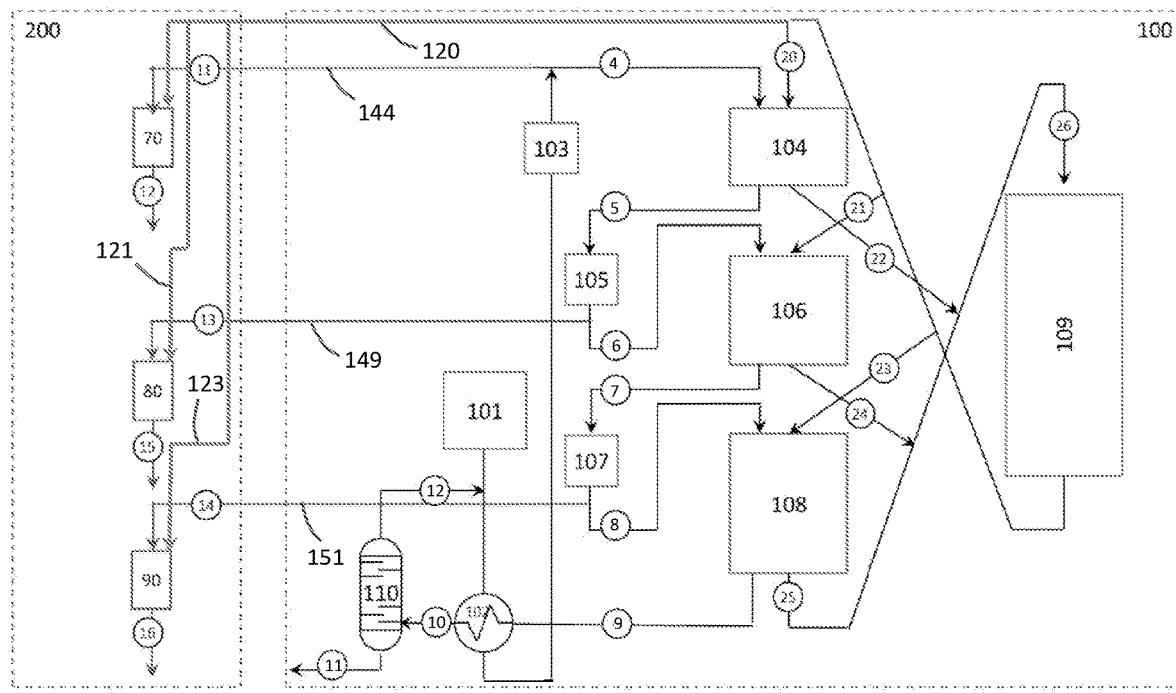
FIG. 5 shows another embodiment of the system according to the invention configured for testing regenerated catalyst.

FIG. 5 shows an embodiment of the pilot system similar to that of FIG. 4, which differs with respect to the flow of catalyst between the reactors of the commercial system 100 and the catalyst regenerator 109. As shown in FIG. 5, catalyst is not moved from one reactor to the next but is directly conducted from each reactor to the regenerator 109 and from the regenerator directly back to each individual reactor 104, 106, 108.

The reactor lengths, both chemical and test, can be from 0.5 to 50 meters long, and are preferably from 1 to 5, and preferably 1-3 meters long. A further preferred embodiment has reactors with an ID (internal diameter) ranging from 1 cm to 25 cm, and preferably 1-10 cm.

In other embodiments, the reactor system provides means for recycling gas, such as hydrogen gas, to these quench spaces. Optionally, additional heaters or furnaces can be provided before each test reactor. This helps maintaining the temperature of the hydrocarbon feed introduced into the test reactors equal to the temperature of the hydrocarbon feed introduced into the chemical reactors of the commercial system.

Similarly, in any and all embodiments of the invention, the nature of the catalyst(s) in the test reactors is "open." In other words, while the catalyst(s) used in the test reactor may be identical to the catalysts of the commercial reactor, they may be similar, or completely different.

Essentially, the nature of the catalyst(s) used in the test reactor is completely open to the artisan's choice. Any of the catalysts described herein may also comprise an inert diluents, such as glass beads or silicon carbide. The skilled artisan also knows that different catalyst configuration are known and used, such as, but not being limited to, fixed bed or moving bed. Further, the catalysts may be deployed in single or multiple layers.

The artisan will recognize that the concepts discussed herein, such as separating liquid and solid feedstocks, require instrumentation and conditions, which are well known. This disclosure does not repeat features that are well known to the skilled artisan.

Optionally, the pilot plant system also has one or more additional inlets for adding materials, such as hydrogen or other gases to the system, so as to more closely parallel the reaction in the commercial reactor.

The conditions which are used in the commercial and test unit are identical. Exemplary, but not limitative of the conditions, are an operating pressure of 50 bars or less, a reaction temperature of from 100-550° C., and LHSV of 0.1-20 h−1, and so forth.

In embodiments, the pilot plant system may include any embodiment of the test unit 200 alone or the test unit 200 and any or all of the components of any of the embodiments of the commercial unit.

Additional potential embodiments include adding grading material to the test reactor, and the catalyst beds can be diluted with, e.g., inert material, so as to enhance catalyst wetting and axial dispersions.

With reference again to the petrochemical arts, the reactors (both commercial and test) can be insulated to minimize heat loss, and the test reactors can be operated either through the commercial reactor cycle, at intervals, or at any time interval desired by the operator.

In operation, additives can be included in the feedstock of the test reactors, so as to simulate products such as, but not being limited to, chloride, hydrogen sulfide and ammonia. Continuing with features of the feedstock, this can be added to the reactors as up-flow or down-flow.

It will also be understood that the test reactors can be adapted to simulate standard conditions of a commercial reactor, such as start-up, shut-down, catalyst activation, catalyst regeneration, and so forth.

The terms and expression which have been employed are used as terms of description and not of limitation, and there is no intention in the use of such terms and expression of excluding any equivalents of the features shown and described or portions thereof, it being recognized that various modifications are possible within the scope of the invention.

We claim:

1. A process for assessing a performance of a catalyst, comprising:
heating a mixture of hydrocarbon feedstock and a gas with a heater to form a vaporous hydrocarbon mixture;
introducing a first portion of the vaporous hydrocarbon mixture to a chemical reactor and a second portion of the vaporous hydrocarbon mixture into a test reactor via a conduit in flow communication with the chemical reactor and with the test reactor, said chemical reactor and said test reactor each containing a catalyst;
circulating said mixture in said test reactor to react said mixture with the catalyst in the test reactor to produce an effluent;
testing said effluent to determine the performance of the catalyst in the test reactor in said mixture;
removing the catalyst contained in the chemical reactor and regenerating said catalyst from the chemical reactor in a regenerator to produce regenerated catalyst; and
introducing a first portion of the regenerated catalyst to the chemical reactor and a second portion of the regenerated catalyst to the test reactor via another conduit in flow communication with the chemical reactor and the test reactor, wherein the regenerated catalyst replaces the catalyst previously contained in the test reactor.

2. The process of claim 1, further comprising providing a plurality of test reactors, and conducting said second portion of the vaporous hydrocarbon mixture to said plurality of test reactors.

3. The process of claim 1, further comprising:
reheating an effluent from the chemical reactor with a further heater;
conducting a first portion of the reheated effluent to a further chemical reactor and a second portion of the reheated effluent to a further test reactor via a conduit in flow communication with the further chemical reactor and the further test reactor, said further chemical reactor and said further test reactor each containing a catalyst; and
testing an effluent from the further test reactor to determine the performance of the catalyst in the further test reactor.

4. The process of claim 1, wherein said test catalyst contained in the test reactor is identical to the catalyst in the chemical reactor.

5. The process of claim 1, wherein said catalyst contained in the test reactor is different from the catalyst in the chemical reactor.

6. The process of claim 1, further comprising a separation chamber downstream of said test reactor.

7. The process of claim 1, wherein said chemical reactor and test reactor are fixed bed or moving bed reactors.

8. The process of claim 1, wherein said chemical reactor and said test reactor are 0.5 m-100 m long.

9. The process of claim 1, wherein the feedstock is naphtha for catalytic reforming.

10. The process of claim 1, wherein the chemical reactor is part of a petrochemical processing system of endothermic nature.

11. A process for assessing a performance of a catalyst, comprising:

heating a mixture of hydrocarbon feedstock and a gas with a heater to form a vaporous hydrocarbon mixture;

introducing a first portion of the vaporous hydrocarbon mixture to a chemical reactor and a second portion of the vaporous hydrocarbon mixture into a test reactor via a conduit in flow communication with the chemical reactor and with the test reactor, said chemical reactor and said test reactor each containing a catalyst;

circulating said mixture in said test reactor to react said mixture with the catalyst in the test reactor to produce an effluent;

testing said effluent to determine the performance of the catalyst in the test reactor in said mixture;

reheating an effluent from the chemical reactor with a further heater;

conducting a first portion of the reheated effluent to a further chemical reactor and a second portion of the reheated effluent to a further test reactor via a conduit in flow communication with the further chemical reactor and the further test reactor, said further chemical reactor and said further test reactor each containing a catalyst;

testing an effluent from the further test reactor to determine the performance of the catalyst in the further test reactor;

removing the catalyst contained in the chemical reactor and regenerating said catalyst from the chemical reactor in a regenerator to produce regenerated catalyst;

introducing a first portion of the regenerated catalyst to the chemical reactor and a second portion of the regenerated catalyst to the test reactor, wherein the regenerated catalyst replaces the catalyst previously contained in the test reactor; and introducing at least one further portion of the regenerated catalyst to at least one further test reactor via a conduit in flow communication with the further chemical reactor and the at least one further test reactor, wherein the regenerated catalyst replaces the catalyst previously contained in at least one further test reactor.

12. A process for assessing a performance of a catalyst, comprising:

heating a mixture of hydrocarbon feedstock and a gas with a heater to form a vaporous hydrocarbon mixture;

introducing a first portion of the vaporous hydrocarbon mixture to a chemical reactor and a second portion of the vaporous hydrocarbon mixture into a test reactor via a conduit in flow communication with the chemical reactor and with the test reactor, said chemical reactor and said test reactor each containing a catalyst;

circulating said mixture in said test reactor to react said mixture with the catalyst in the test reactor to produce an effluent;

testing said effluent to determine the performance of the catalyst in the test reactor in said mixture;

reheating an effluent from the chemical reactor with a further heater;

conducting a first portion of the reheated effluent to a further chemical reactor and a second portion of the reheated effluent to a further test reactor via a conduit in flow communication with the further chemical reactor and the further test reactor, said further chemical reactor and said further test reactor each containing a catalyst;

testing an effluent from the further test reactor to determine the performance of the catalyst in the further test reactor;

removing the catalyst contained in the chemical reactor and regenerating said catalyst from the chemical reactor in a regenerator to produce regenerated catalyst; and introducing portions of the regenerated catalyst to the chemical reactor, the test reactor and a further test reactor, wherein the regenerated catalyst replaces the catalyst previously contained in the test reactor and the further test reactor.

* * * * *